(12) United States Patent
Ramsden et al.

(10) Patent No.: US 11,009,616 B2
(45) Date of Patent: May 18, 2021

(54) NEUTRON DETECTION

(71) Applicant: Symetrica Limited, Southhampton (GB)

(72) Inventors: David Ramsden, Southhampton (GB); Mark Abbott Foster, Southhampton (GB)

(73) Assignee: Symetrica Limited, Southampton (GB)

( * ) Notice: Subject to any disclaimer, the term of this patent is extended or adjusted under 35 U.S.C. 154(b) by 214 days.

(21) Appl. No.: 16/153,547

(22) Filed: Oct. 5, 2018

(65) Prior Publication Data

US 2019/0120980 A1    Apr. 25, 2019

Related U.S. Application Data

(63) Continuation of application No. 15/881,658, filed on Jan. 26, 2018, now abandoned, which is a (Continued)

(30) Foreign Application Priority Data

May 14, 2014    (GB) ..................... 1408516

(51) Int. Cl.
*G01T 3/06* (2006.01)

(52) U.S. Cl.
CPC ..................... *G01T 3/06* (2013.01)

(58) Field of Classification Search
CPC ..................... G01T 3/06
See application file for complete search history.

(56) References Cited

U.S. PATENT DOCUMENTS 5,659,177 A * 8/1997 Schulte ............ G01T 3/08
250/370.05
7,002,159 B2    2/2006 Lacy
(Continued)

FOREIGN PATENT DOCUMENTS

CN    102081166 A    6/2011
GB    2 490 513 A    11/2012
(Continued)

OTHER PUBLICATIONS

J.C. Barton et al.; a Novel Neutron Multiplicity Detector Using Lithium Fluoride and Zinc Sulphide Scintillator; Journal of Physics G: Nuclear and Particle Physics, vol. 17 No. 12; 1991; pp. 1885-1899; IOP Publishing Ltd.; London, UK.
(Continued)

*Primary Examiner* — Hugh Maupin
(74) *Attorney, Agent, or Firm* — Renner, Otto, Boisselle & Sklar, LLP

(57) ABSTRACT

A neutron detector comprises one or more neutron detector modules (20). Each neutron detector module (20) comprises a neutron moderating block (22) having a plurality of neutron detector blades (2) embedded therein. Each neutron detector blade (2) is generally planar and comprises conversion layers on either side of a light-guiding sheet (8). Each conversion layer (4a, 4b) comprises a mixture of a neutron absorbing material and a scintillation material. This light-guiding sheet (8) is arranged to receive photons emitted from the scintillation material. A photodetector (10) is optically coupled to the light-guide (8) and arranged to detect photons generated in the conversion layers (4a, 4b) as a result of neutron absorption events and received into the light-guiding sheet (8).

18 Claims, 4 Drawing Sheets

Related U.S. Application Data continuation of application No. 15/627,374, filed on Jun. 19, 2017, now abandoned, which is a continuation of application No. 15/310,896, filed as application No. PCT/GB2015/051227 on Apr. 28, 2015, now abandoned.

(56) References Cited

U.S. PATENT DOCUMENTS

| | | | |
|---|---|---|---|
| 2005/0135535 A1* | 6/2005 | Wallace | G01T 3/06 376/153 |
| 2012/0317791 A1 | 12/2012 | Frank | |
| 2013/0099125 A1 | 4/2013 | Grodzins | |
| 2015/0355346 A1* | 12/2015 | Weston | G01T 3/06 250/483.1 |

FOREIGN PATENT DOCUMENTS

| | | |
|---|---|---|
| WO | 2011/022663 A1 | 2/2011 |
| WO | 2012/007734 A2 | 1/2012 |
| WO | 2013/126876 A1 | 8/2013 |

OTHER PUBLICATIONS

James H. Ely et al.; Alternatives for Helium-3 in Multiplicity Counters; IEEE Transactions on Nuclear Science, vol. 60, No. 2; Apr. 2013; pp. 510-514; IEEE; Richland, WA, USA.

Matthew Dallimore et al.; The Development of a Scalable HE-3 Free Neutron Detection Technology and its Potential Use in Nuclear Security and Physical Protection Applications; 2011; Symetrica Inc; Maynard, MA, USA.

International Search Report and Written Opinion for corresponding Patent Application No. PCT/GB2015/051227 dated Jul. 24, 2015.

Original EP Communication pursuant to Article 94(3) EPC for corresponding EP Application No. 15719284.0, dated Apr. 1, 2021.

* cited by examiner

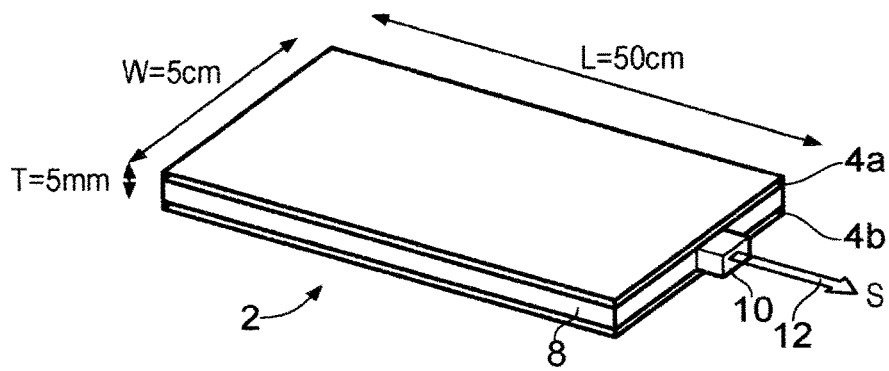
FIG. 5
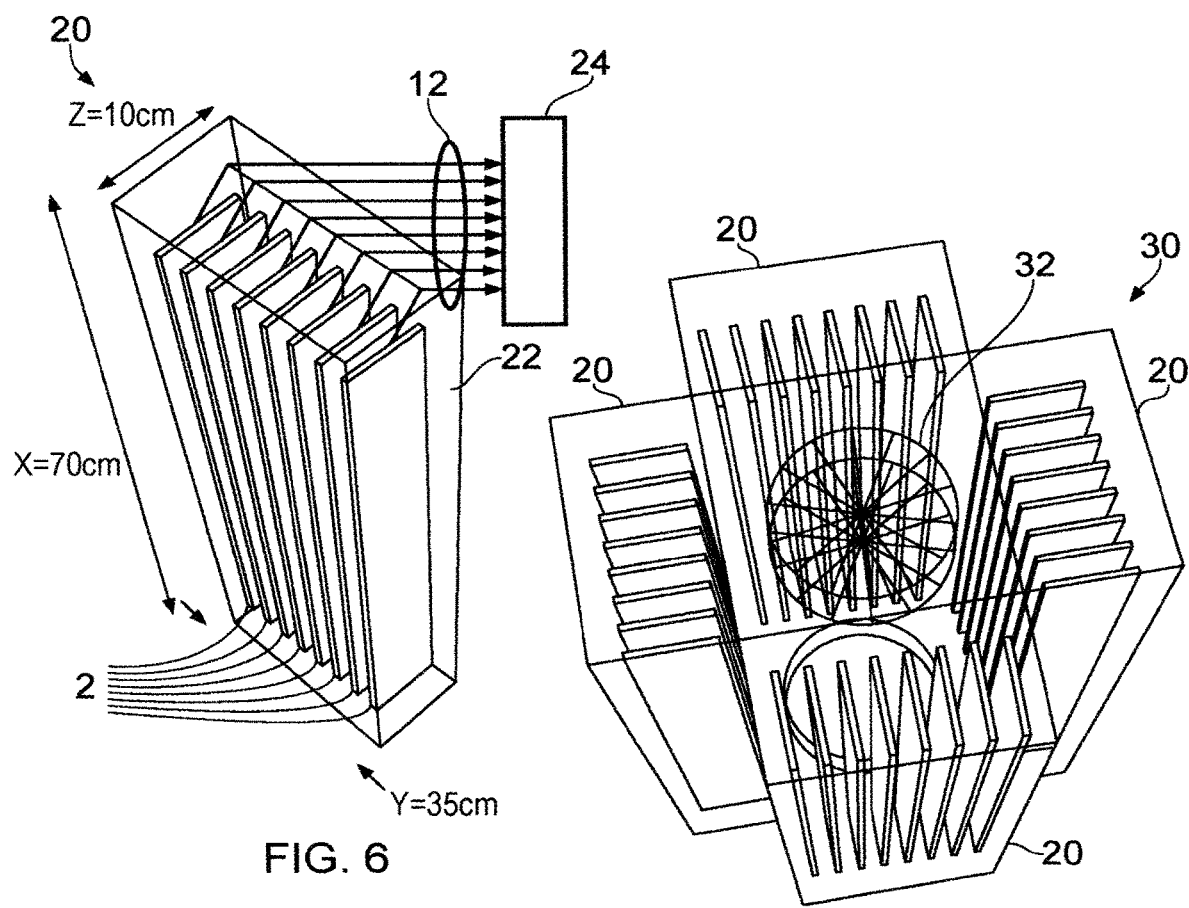
FIG. 6
FIG. 7

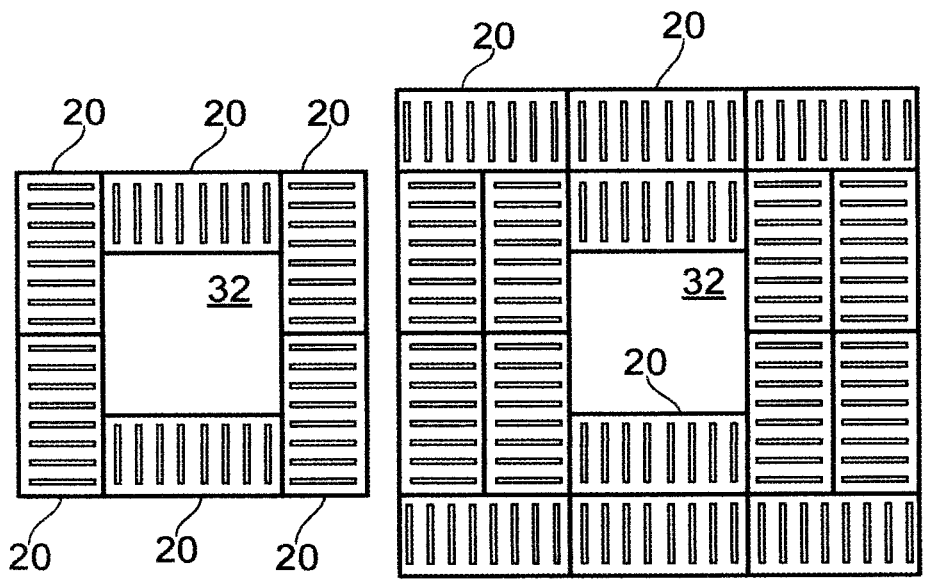
FIG. 8
FIG. 9
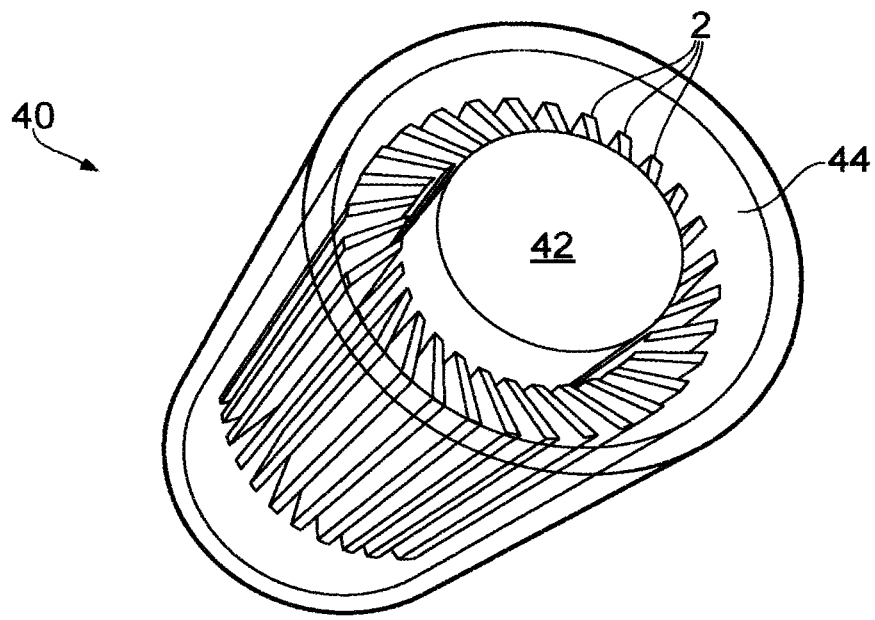
FIG. 10

NEUTRON DETECTION

BACKGROUND OF THE INVENTION

The present invention relates to the field of neutron detection, in particular for neutron detection for nuclear assay purposes.

There are many situations in which it can be important to reliably measure the amount of nuclear fissile material present in a sample (that is to say to perform nuclear assay measurements). For example, national and international nuclear regulatory agencies need to maintain an inventory of the quantity of fissile material present within their domain. To this end, so-called nuclear safeguards instrumentation may be used to detect the diversion of nuclear material from declared facilities, or to detect the clandestine production, diversion or processing of nuclear material. The verification of the physical inventory at processing facilities hinges on the use of non-destructive assay (NDA) instruments which are typically based on either neutron, gamma, or calorimetric detection. Other situations where it is important to reliably measure the amount of nuclear fissile material present in a sample include Arms Control and Treaty Verification measurements and irradiated fuel measurements to quantify how much nuclear fuel remains 'unburnt' when fuel elements are removed from a reactor before their return to a storage or re-processing facility. Another scenario is for characterising nuclear waste to help prevent fissile material being wrongly consigned in nuclear waste.

A known approach to quantify fissile materials, such as uranium and plutonium present in a sample, is based on identifying the rate of 'coincident' detections of neutrons arising from the spontaneous or induced fission in the sample. The general aim of nuclear assay measurements is to estimate the number of fissile nuclei present within a sample of material. This can be done by measuring the rate of neutron detection events seen using a plurality neutron detector elements surrounding a sample which can be attributed to fission events in which multiple neutrons are simultaneously ejected from the sample, typically with an average energy of around 2 MeV. Since these neutrons must first thermalise before detection, the neutrons associated with an event in which multiple neutrons are produced are rarely detected in strict coincidence. Consequently a technique has become established based on a shift-register analysis to measure a degree of timing correlation between potentially large numbers of neutron detection events within an instrument [1]. With this kind of shift-register analysis, a coincidence gate is opened when a trigger neutron pulse from a detector is received at a shift register. The duration (gate-width) for the coincidence gate is selected according to the die-away time of the detector. When another neutron is detected during the coincidence gate (coincidence window), it is counted. Neutrons detected within the coincidence gate may be in "true" coincidence (i.e. associated with a common neutron decay event in the sample), or may be in "false" coincidence, i.e. associated with uncorrelated events. The significant coincidence rate for assay purposes is the "true" coincidence rate (coincidence rate after subtracting the "false" coincident rate) which can provide an estimate of the quantity of fissile material present within the sample.

In this regard there is now a well-established and internationally validated shift-register package available "off the shelf" for processing neutron detection event signals for nuclear assay purposes, for example of the kind described by D. T. Reilly in "Passive Nondestructive Assay of Nuclear Materials" [1]. A range of different neutron detection approaches have been developed to detect neutrons and provide corresponding neutron detection event signals for processing in accordance with this recognized processing approach. Two broad types of detection system exist. One type may be referred to as passive interrogation detectors which operate to measure neutrons generated by the spontaneous fission of nuclei within the material sample. The other type may be referred to as active interrogation detectors and these use an external source to stimulate fission events, for example for low self-activity samples (such as uranium bearing materials) or to boost sample fission signature counts above a high gamma-ray background (e.g. in a spent fuel assay implementation).

FIG. 1 schematically represents a known neutron coincidence well counter based on the use of helium-3 proportional neutron counters, namely Canberra's JCC-31 (www.canberra.com/products/waste_safeguard_systems/pdf/JCC-31-SS-C36906.pdf) [2]. The upper part of the figure represents the device in horizontal cross-section and the lower part of the figure represents the device in vertical cross-section. The detector is a portable non-destructive assay system used for high mass Pu bearing samples (20-2000 g) based on passive neutron counting. The device is considered to set a baseline target system for coincidence counting applications due to its wide use in the Nuclear Safeguards Community and its ability to handle relatively high count rates from kilogram-range mass Pu samples. The device has a ring of eighteen Helium-3-based neuron detectors (3-He tubes) around a sample cavity in which a sample to be assayed is received. The JCC-31 measures the effective mass of fissile material in the sample by detecting coincidence neutrons from the spontaneous fission of nuclei as discussed above. The JCC-31 has a cylindrical-shaped sample cavity 41 cm high by 17 cm in diameter. A cadmium sleeve surrounds the sample cavity to prevent the re-entry of thermalized neutrons into the sample, which could induce fission in the sample and adversely affect the results. Outside the cadmium sleeve is a ring of high-density polyethylene and the eighteen 3-He tubes. The 3-He tubes are divided into six groups of three with each group wired together and connected to one amplifier/discriminator circuit board for coincidence analysis.

FIG. 2 schematically represents another previously-proposed 3-He-based device known as an Epithermal Neutron Multiplicity Counter [3]. The left-hand part of the figure represents the device in vertical cross-section and the right-hand part of the figure represents the device in horizontal cross-section. The device represented in FIG. 2 is based on broadly the same detection technologies as the device of FIG. 1, but comprises 121 3-He tubes arranged in four rings around a sample cavity having a diameter of 200 mm and a height of 430 mm. The detector is reported to have an efficiency of 65.5% and a die-away time of 23.2 microseconds. The higher efficiency allows for neutron multiplicity counting.

Some sample types, such as fuel assemblies, are difficult to assay in a well-counter configuration because of their size. In this regard collar-type (as opposed to well-type) detector configurations may be used to accommodate larger sample types, for example Canberra's JCC-71 (www.canberra.com/products/waste_safeguard_systems/pdf/JCC-71-72-73-SS-C38898.pdf) [4]. This detector may be configured for active or passive interrogation operation. The device is presented for use for quantifying 235-U in fresh PWR (pressurized water reactor), BWR (boiling water reactor) and CANDU (Canadian light water reactor) fuel assemblies, and for measuring plutonium in MOX (mixed oxide) fuel. In the passive mode the device comprises four banks of neutron counters, each comprising several 3-He tubes, around a sample space. In the active mode, one of the banks is replaced by an interrogating neutron source, to measure 235-U.

A drawback with the above-described detectors is their reliance on 3-He. There has over the years been a significant reduction in the availability of 3-He following the reduction in the stock-pile of nuclear weapons. Due to the shortage of 3-He in recent years, there has been recognised a need to replace the neutron detection technology that has been at the heart of these systems since their conception. For many years, the 'gold standard' for the detection of thermal neutrons was set by proportional counters based on the use of 3-He, but the Nuclear Safeguards Community now seeks alternative technologies which do not rely on 3-He.

There are several properties of 3-He which make it well suited for nuclear assay detectors. For example, detectors based on 3-He typically have high thermal-neutron detection efficiency, good neutron-gamma discrimination, a short dead-time, and various practical operational advantages, such as high stability, non-inflammability, non-toxicity, and long operational lifetime. This means that finding a suitable replacement technology able to provide comparable performance represents a significant technical challenge. The issue has been investigated extensively over the past few years, and several 3-He replacement technology options have been proposed, such as those based on boron-lined tubes or plates, boron trifluoride as a proportional gas, boron loaded plastic scintillators, as well as LiF:ZnS(Ag) screens on wavelength-shifting light-guides. These alternate technologies have been widely discussed, for example in documents [5], [6], [7], [8], [9], [10], [11], [12] and [13]. Some 3-He alternate technology detectors have been implemented in safeguards counters with some degree of success, but several are still in the developmental stage.

In addition to providing sufficient detection efficiency, 3-He replacement technologies should also allow deployment in configurations having sufficiently short neutron die-away times to allow an appropriate precision for coincidence detection. In this regard, a recognised figure of merit (FOM_2) for characterising the performance of a neutron detector is defined both in terms of single neutron detection efficiency $\varepsilon$ (%) and detector die-away time $\tau$, which is a measure of the mean time-delay expected between a fission event and the detection of a neutron following moderation. This figure of merit is conventionally defined as FOM_2=$\varepsilon/\sqrt{\tau}$ and it may be used to compare detector performance for different detector technologies and configurations against one another. A relatively high value for FOM_2 indicates a detector with relatively high efficiency and/or relatively low die-away time. Generally speaking, it can be desirable to have neutron detector elements that are compact and, when in a well counter configuration, do not rely on large amounts of surrounding material for moderation since this can extend the detector's neutron die-away time.

An LiF:ZnS(Ag)-based detector used for Pu assay and independent measurements of neutrons and gamma rays is described in document [7]. This detector uses LiF:ZnS(Ag) material as a thin screen, coupled to wavelength shifting fibres in the form of a ribbon. These layers can be combined to produce slabs which can then be assembled to surround a sample on four sides forming a well counter. One side consists of 3 individual detector bundles per side. As example of such a slab is represented in FIG. 3.

FIG. 4 schematically represents another previously-proposed LiF:ZnS(Ag)-based detector as described in document [9]. The left-hand part of the figure represents the device in vertical cross-section and the right-hand part of the figure represents the device in horizontal cross-section. The detector is presented as a demonstrator unit to determine the feasibility of utilizing LiF:ZnS(Ag) detectors in a well counter configuration. The detector comprises four walls, around 1.5 m tall, surrounding a central cavity for source placement. Each wall comprises alternating layers of five LiF:ZnS(Ag) screens between six polyvinyltoluene (PVT) sheets. A single PMT detector is provided at the top and bottom of each wall to receive light from the LiF:ZnS(Ag) screen which is guided by the polyvinyltoluene (PVT) sheets to the PMT.

Various other previously-proposed designs are described in the above-identified documents. However, none of these previously-proposed designs have been able to provide a practical detector having performance comparable to a 3-He based detector for nuclear assay purposes. There is therefore a need for new methods and apparatus for neutron detection which do not rely on 3-He detectors, but which have improved performance over existing designs, for example in terms of helping to achieve performance comparable to 3-He-based detectors for nuclear assay purposes.

SUMMARY OF THE INVENTION

According to a first aspect of the invention there is provided a neutron detector comprising one or more neutron detector modules, each neutron detector module comprising a neutron moderating block having a plurality of neutron detector blades embedded therein, wherein each neutron detector blade comprises: a conversion layer comprising a mixture of a neutron absorbing material and a scintillation material; a light-guide arranged to receive photons emitted from the scintillation material; and a photodetector optically coupled to the light-guide and arranged to detect photons generated as a result of neutron absorption events in the conversion layer.

In accordance with some embodiments, the neutron detector comprises a plurality of neutron detector modules.

In accordance with some embodiments, for each neutron detector blade the conversion screen comprises a first conversion screen disposed on a first side of the light-guide and the neutron detector blade further comprises a second conversion screen disposed on a second side of the light-guide, the second side opposing the first side, such that the light-guide is arranged to also receive photons emitted from the second conversion screen.

In accordance with some embodiments, each neutron detector blade is in the form of a planar sheet having: a characteristic length within a range selected from the group comprising: 10 cm to 90 cm; 20 cm to 80 cm; 30 cm to 70 cm; and 40 cm to 60 cm; and/or a characteristic width within a range selected from the group comprising: 1 cm to 25 cm; 1 cm to 20 cm; 1 cm to 15 cm; and 1 cm to 10 cm; and/or a characteristic thickness less than or equal to an amount selected from the group comprising: 1 cm; 0.9 cm; 0.8 cm; 0.7 cm; 0.6 cm; 0.5 cm; 0.4 cm; 0.3 cm; and 0.2 cm.

In accordance with some embodiments, each neutron detector blade is in the form of a planar sheet having with a thickness matched to a width of the sensitive area of its photodetector.

In accordance with some embodiments, each neutron detector blade has a length and a width and a thickness, and wherein: the length is greater than the width by more than a factor selected from the group comprising: 4, 6, 8, 10 and 12;

and/or the width is greater than the thickness by more than a factor selected from the group comprising: 5, 10, 15, 20 and 25.

In accordance with some embodiments, neighbouring neutron detector blades in the one or more neutron detector modules are separated by an amount within a range selected from the group comprising: 0.5 cm to 10 cm; 2 cm to 5 cm and 3 cm to 4 cm.

In accordance with some embodiments, each of the one or more neutron detector modules has a cross-section in a plane perpendicular to an axis of extent of the neutron detector which comprises at least a part of an annular ring.

In accordance with some embodiments, each of the one or more neutron detector modules has a cross-section in a plane perpendicular to an axis of extent of the neutron detector which comprises a rectangle.

In accordance with some embodiments, each neutron detector module is in the form of a rectangular block having: a characteristic length within a range selected from the group comprising: 30 cm to 120 cm; 40 cm to 100 cm; 50 cm to 90 cm; and 60 cm to 80 cm; and/or a characteristic width within a range selected from the group comprising: 10 cm to 50 cm; 10 cm to 40 cm; 20 cm to 40 cm; and 30 cm to 40 cm; and/or a characteristic thickness within a range selected from the group comprising: 3 cm to 30 cm; 3 cm to 25 cm; 3 cm to 20 cm; 3 cm to 15 cm; and 3 cm to 10 cm.

In accordance with some embodiments, the one or more neutron detector modules are arranged so that the neutron detector blades at least partially surround a sample volume for receiving a sample from which neutrons are to be detected.

In accordance with some embodiments, the one or more neutron detector modules are arranged so that a first group of neutron detector blades at least partially surrounds the sample volume and a second group of neutron detector blades at least partially surrounds the sample volume and the first group of neutron detector blades.

In accordance with some embodiments, at least the majority of neutron detector blades comprising the neutron detector have their largest surfaces arranged in a way which is not squarely facing the sample volume.

In accordance with some embodiments, for each neutron detector blade the photodetector comprises a solid state photodetector.

In accordance with some embodiments, the neutron detector further comprises a processor arranged to receive output signals from the photodetectors and to process the output signals to determine when neutron detection events occur in one or more of the neutron detector blades.

In accordance with some embodiments, the output signals comprise photodetector signals from respective neutron detector blades.

In accordance with some embodiments, the output signals comprise combined photodetector signals from groups of neutron detector blades.

In accordance with some embodiments, the neutron detector blades in each group of neutron detector blades for which output signals are combined are the neutron detector blades in a neutron detector module.

According to a second aspect of the invention there is provided a method for detecting neutrons, comprising: providing one or more neutron detector modules, each neutron detector module comprising a neutron moderating block having a plurality of neutron detector blades embedded therein, and wherein each neutron detector blade comprises: a conversion layer comprising a mixture of a neutron absorbing material and a scintillation material; a light-guide arranged to receive photons emitted from the scintillation material; and a photodetector optically coupled to the light-guide and arranged to detect photons generated as a result of neutron absorption events in the conversion layer; wherein the method comprises detecting photons generated in respective conversion layers and received in the respective light-guides using the respective photodetectors.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which:

FIG. 5 schematically represents a neutron detector blade for use in a neutron detector according to an embodiment of the invention;

FIG. 6 schematically represents a neutron detector module comprising a plurality of neutron detector blades of the kind represented in FIG. 5 for use in a neutron detector according to an embodiment of the invention;

FIG. 7 schematically represents an assembly of neutron detector modules of the kind represented in FIG. 6 for use in a neutron detector according to an embodiment of the invention;

FIG. 8 schematically represents another assembly of neutron detector modules of the kind represented in FIG. 6 for use in a neutron detector according to an embodiment of the invention;

FIG. 9 schematically represents another assembly of neutron detector modules of the kind represented in FIG. 6 for use in a neutron detector according to an embodiment of the invention; and FIG. 10 schematically represents a neutron detector comprising a plurality of neutron detector blades of the kind represented in FIG. 5 for use in a neutron detector according to another embodiment of the invention.

DETAILED DESCRIPTION

Figure 1:
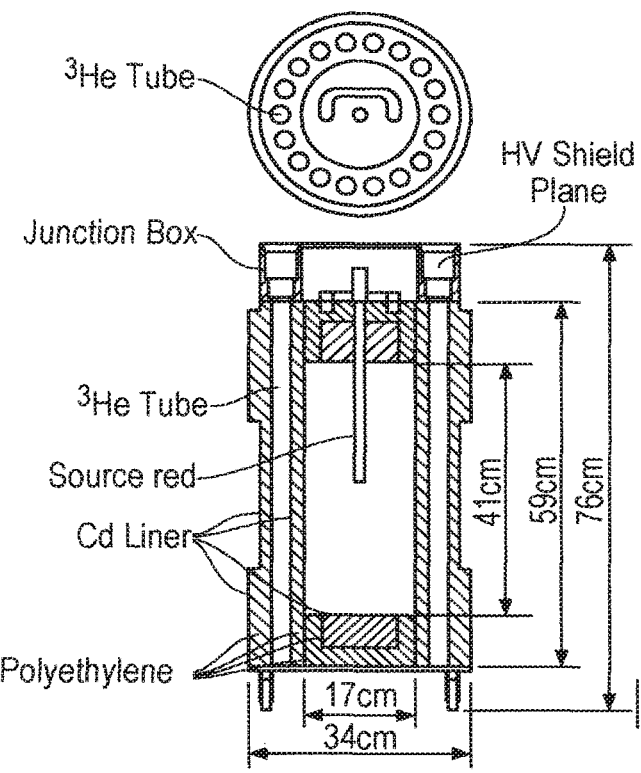
FIGS. 1 and 2 schematically represent two previously proposed 3-He based neutron detectors.
Figure 2:
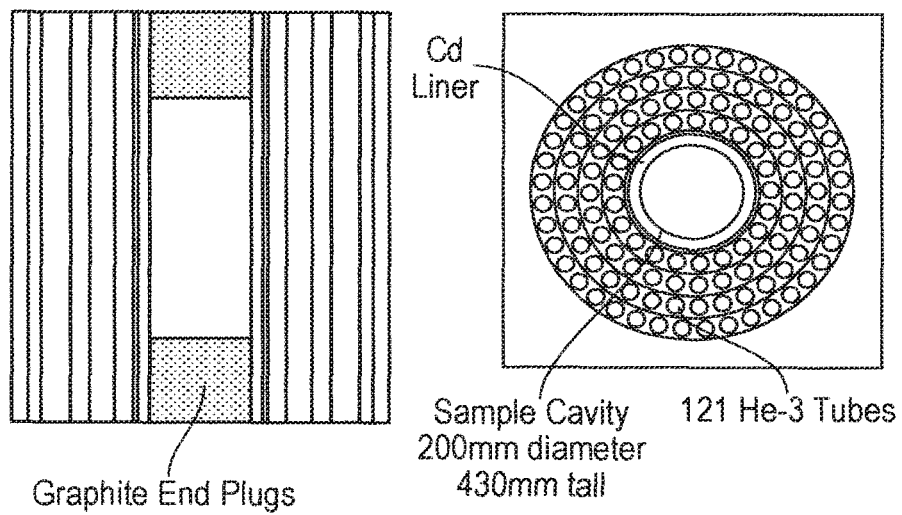
Figure 3:
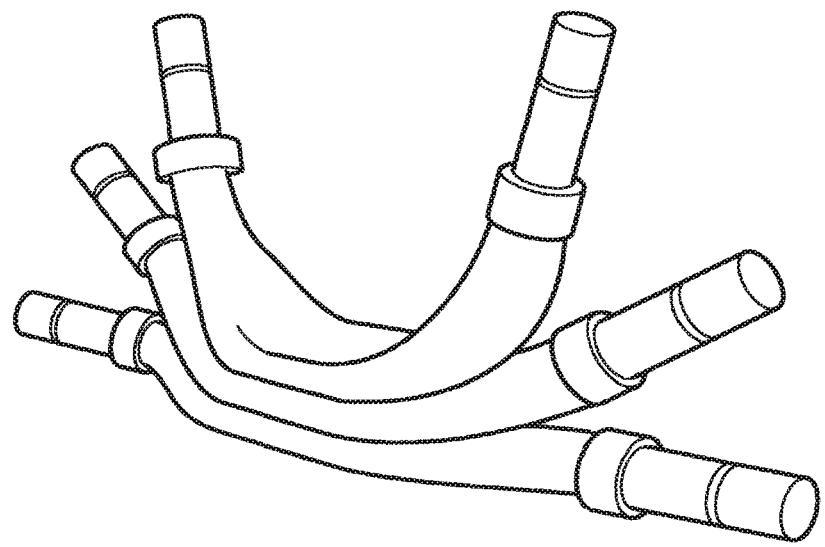
FIGS. 3 and 4 schematically represent two previously proposed 6-Li:ZnS(Ag) based neutron detectors.
Figure 4:
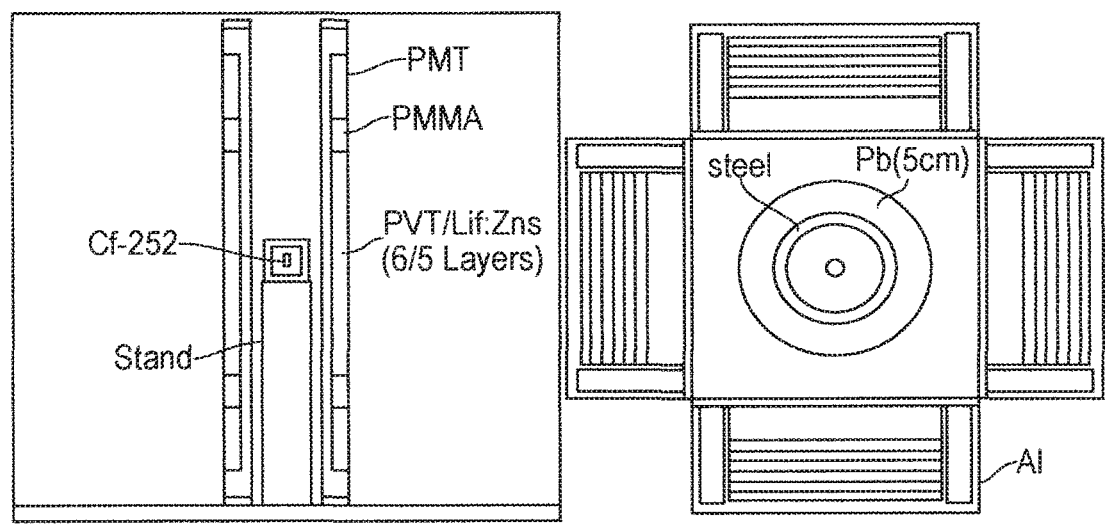

Aspects and features of certain examples and embodiments of the present invention are described herein. It will be appreciated that aspects and features of the apparatus and methods discussed herein which are not specifically described may be implemented in accordance with conventional techniques.

Certain embodiments of the invention provide a neutron detector comprising one or more neutron detector modules. Each neutron detector module comprises a neutron moderating block, for example HDPE (high density polyethylene), having a plurality of neutron detector elements embedded therein. For example, the moderating block may be provided with slots to receive the neutron detector elements. In principle the neutron detector elements may be cast into the moderating block during manufacture assuming the detector elements remain stable at the relevant temperature. The neutron detector elements may be referred to as neutron detector blades. Each neutron detector blade comprises a neutron conversion layer on either side of a generally planar light-guide, e.g. formed of a PVT sheet. Each conversion layer comprises a mixture of a neutron absorbing material, such as 6-LiF, and a scintillation material such as ZnS(Ag), in accordance with established conversion-screen neutron detection techniques (e.g. as generally described in document [5]). The light-guides are arranged to receive photons emitted from the scintillation material of their conversion layers as a result of neutron absorption events in one or other of the conversion layers, and to guide the photons to a photodetector optically coupled to one end of the light-guide. Output signals from the photodetector thus provide an indication of a neutron interaction event in one of the conversion layers for the relevant detector blade.

FIG. 5 schematically shows in perspective view one such neutron detector blade 2 for use in a neutron detector in accordance with an embodiment of the invention. The detector blade 2 has a generally rectangular planar form and comprises a generally layered structure. The largest surfaces of the detector blade (i.e. the uppermost and lowermost surfaces represented in FIG. 5) may be referred to as the detector blade's faces, while the surfaces connecting between the detector blade's faces may be referred to as its edges. In particular, the longer pair of edges may be referred to as side-edges and the shorter pair of edges may be referred to as end-edges. Similar terminology may also be used in respect of the individual layers comprising the detector blade.

The neutron detector blade 2 comprises a pair of neutron absorbing conversion screens 4a, 4b arranged on either side of a wavelength-shifting light-guide 8 in the form of a PVT plank. The light-guide 8 is coupled to a photodetector 10, e.g. a silicon photomultiplier detector. Output signals S from the photodetector 10 (schematically shown by arrows 12) are passed to a processor for processing as discussed further below. The detector blade 2 in this example comprises a single photodetector 10 on one end-edge of the light-guide 8. However, in other implementations there may be multiple photodetectors associated with each detector blade, for example comprising a plurality of photodetectors arranged along one end-edge, or otherwise arranged around the edges, of the light-guide. The principles of operation and construction for the individual detector blades 2 comprising a detector in accordance with an embodiment of the invention may follow broadly conventional techniques for conversion-screen neutron detectors. Although not represented in FIG. 5, the detector blade may be wrapped in a light-tight material to prevent the risk of external light from reaching the photodetector.

The characteristic scale of the detector blade is as schematically shown in the figure (although it will be appreciated that some aspects of the figures are not drawn to scale). Thus in this example, the detector blade 2 is in the form of a rectangular sheet with an overall length L of around 50 cm, a width W of around 5 cm, and an overall thickness T of around 0.5 cm (e.g., comprising a 3-mm thick light-guide and two 1-mm thick conversion screens). The photodetector 10 is sized to match the thickness of the light-guide 8, for example the photodetector may comprise a 3 mm square silicon photomultiplier optically coupled to the middle of an end edge of the light-guide 8, as schematically represented in FIG. 5.

It will, of course, be appreciated that other sizes of neutron detector blade may be selected according to the desired sensitivity and overall geometry. For example, in accordance with various embodiments of the invention, and according to implementation, the detector blades may have a characteristic length L within a range selected from the group comprising: 10 cm to 90 cm; 20 cm to 80 cm; 30 cm to 70 cm; and 40 cm to 60 cm; and/or a characteristic width W within a range selected from the group comprising: 1 cm to 25 cm; 1 cm to 20 cm; 1 cm to 15 cm; and 1 cm to 10 cm; and/or a characteristic thickness T less than or equal to an amount selected from the group comprising: 1 cm; 0.9 cm; 0.8 cm; 0.7 cm; 0.6 cm; 0.5 cm; 0.4 cm; 0.3 cm and 0.2 cm.

The conversion screens 4 (defining the neutron-sensitive active area) and the light-guide 8 have faces with broadly corresponding areal extents. In this example embodiment the conversion screens 4 each comprise a layer made up of a mixture of the neutron absorbing material and scintillating material mounted on a substrate. Each substrate in this example embodiment is an aluminium sheet with a reflective face on the side of its respective conversion layer. The reflective face may be provided by polishing the aluminium or by an intermediate coating, e.g. a diffusively reflecting white coating. In other examples the substrate of the conversions layers may be a polyester sheet with a reflective backing on the outside faces of the conversion screens and facing inwards towards the light-guide 8. The reflective backing may be affixed to the substrate or may comprise a separate element. Alternatively, or in addition, the substrate of the conversions layers may be translucent, e.g., comprising Mylar™ or Melinex™.

The mixture of neutron absorbing material and scintillator material comprises powdered forms of each which are mixed in a resin binder and spread onto the substrate, e.g. in a layer perhaps around 0.5 to 1 mm thick, and left to set. In other example embodiments the neutron absorbing material and scintillating material mixture may be deposited directly on the light guide 8 (that is to say, the light-guide may in effect provide a substrate for the conversion screens 4). However, this approach may be less appropriate in some situations, for example for relatively long detector blades, because of the potential for a reduction in light-guiding efficiency in the light-guide due to the absence of total internal reflection. In this example, the neutron absorbing material comprises 6-Li enriched LiF and the scintillator material comprises ZnS(Ag). In other examples the neutron absorbing material may be based on/include other neutron-absorbing elements, e.g. 10-B based material, such as a 10-$B_2O_3$ mixture. Equally, in other examples the scintillator material may be based on/include other scintillator material, e.g. using pure CsI or yttrium aluminium perovskite (YAP) in powdered/granular form.

In this example the light-guide 8 comprises a sheet of wavelength-shifting plastic scintillator material, e.g. based on polyvinyltoluene (PVT) such as the EJ-280 materials available from Eljen Technology, Tex., USA.

The light-guide 8 is placed in loose contact with the conversion screens 4a, 4b so that optical photons from the scintillator material in the conversion screens are readily coupled into the light-guide 8. The conversion screens in this example are in loose contact and not bonded contact with the light-guide 8. In other examples the conversion screens may be optically bonded to the wavelength shifting light-guide 8, but again this approach may be less appropriate in some situations, for example for relatively long detector blades, because of the potential for a reduction in the occurrence of total internal reflection within the light-guide.

The role of the conversion screens 4 is to convert incidents neutrons into light. Thus a neutron from a sample under assay which is incident on the detector blade 2 may be absorbed by the associated neutron absorbing material in one or other of its conversion screens 4a, 4b by interacting with one of the 6-Li nuclei. This reaction (6-Li3+

1n0→3H1+4α2+4.78 MeV) results in reaction fragments that readily excite the intermixed scintillator ZnS(Ag), causing it to radiate photons. These photons are emitted in all directions, and since the conversion layers 4 are relatively thin, for most interaction sites the light-guide 8 presents a solid angle of around 2π such that close to half the scintillator photons from the neutron interaction that escape the conversion layer enter the light-guide directly. Furthermore, the remaining half of scintillator photons (i.e. those initially travelling away from the light-guide) may be reflected back into the light-guide 8 following reflection from the substrate.

Thus a relatively large fraction of the neutron-induced scintillator photons may be expected to enter the light-guide 8. In general, the initial directions of the photons entering the light-guide 8 will be such that the photons will exit the light-guide the opposing side (e.g., because they enter at too steep an angle). However, if the light-guide comprises a wavelength-shifting material, such as a PVT based material as noted above, the scintillator photons from the ZnS(Ag) intermixed with the neutron-absorbing LiF in the conversion screens 4 may be absorbed in the light-guide 8 and corresponding longer-wavelength photons re-emitted. Significantly, the wave-length shifted photons will be emitted over a broad range of directions such that a good fraction of them are guided to the photodetector 10 for detection than for example embodiments in which the light-guide comprises a non-wavelength shifting material. A fraction of the photons will be guided along the light-guide 8, e.g. by total internal reflection at the surfaces of the light-guide, to interact with the photo-detector 10, and a corresponding output signal 12 generated in the usual way therefrom. These output signals may be processed to determine when neutrons are deemed to be detected in accordance with conventional techniques. For example, output signals may be compared with a threshold signal, and if an output signal is greater than the threshold (and/or satisfies one or more other criteria for example based on pulse shape), it may be assumed the signal corresponds with a neutron interaction event in the corresponding detector blade. Additional processing may be applied in accordance with conventional techniques for identifying from the output signals when neutron detection events are deemed to have occurred, for example processing may be applied to discriminate neutron detection events from gamma-ray detection events in accordance with known techniques (such as described in document [5]).

FIG. 6 represents in schematic perspective view a neutron detector module 20 for use in a detector according to an embodiment of the invention. The neutron detector comprises a moderating block 22 in which a plurality of detector blades 2 are embedded. In this example neutron detector module 20 there are eight neutron detector blades arranged within the neutron detector module 20 in a separated parallel stack arrangement. The moderating block 22 in this example implementation comprises high density polyethylene (HDPE) formed into a suitable shape, for example by casting or machining. Other moderating materials, for example other moderating plastics, could be used in other examples. The detector blades 2 may be embedded during casting (so long as they can withstand the casting temperature) or by virtue of being inserted into slots in the body of the moderating block 22. Although not represented in FIG. 6, the moderating block 22 comprising the detector module 20 may be wrapped in a light-tight material to help prevent external light from reaching the photodetectors of the respective neutron detector blades. The moderating block may also be provided with a cladding, example comprising a cadmium sheet, to help retain thermalized neutrons within the detector module.

The characteristic scale of the detector module 20/moderating block 22 is as schematically shown in the figure (although it will be appreciated that some aspects of the figures are not drawn to scale). Thus in this example, the detector module 20 in the form of a rectangular block with an overall length X of around 70 cm, a width Y of around 35 cm, and an thickness less X of around 10 cm. However, it will be appreciated that other sizes of moderating block may be selected according to the implementation at hand and having regard to a desired amount of moderation and overall geometry. For example, in accordance with various embodiments of the invention, and according to implementation, the detector module 20/moderating block 22 may have a characteristic length X within a range selected from the group comprising: 30 cm to 120 cm; 40 cm to 100 cm; 50 cm to 90 cm; and 60 cm to 80 cm; and/or a characteristic width Y within a range selected from the group comprising: 10 cm to 50 cm; 10 cm to 40 cm; 20 cm to 40 cm; and 30 cm to 40 cm; and/or a characteristic thickness Z within a range selected from the group comprising: 3 cm to 30 cm; 3 cm to 25 cm; 3 cm to 20 cm; 3 cm to 15 cm; and 3 cm to 10 cm.

In line with the terminology used for the detector blades, the largest surfaces of the detector module may be referred to as the detector module's faces, while the surfaces connecting between the detector module's faces may be referred to as its edges. In particular, the longer pair of edges may be referred to as side-edges and the shorter pair of edges may be referred to as end-edges. The blades 2 in this example are arranged in the moderating block 22 with their faces parallel to each other and to the side edges of the moderating block 22, with the detector blades separated from one another by around 3 to 4 cm. The faces of the outermost blades may be separated from the side-edges of the moderating block 22 by a similar distance, or perhaps more, for example somewhere in the range 2 cm to 10 cm. The end-edges of the respective detector blades 2 are in this example separated from the perspective end-edges of the moderating block 22 by around 10 cm and the side edges of the respective detector blades 2 are in this example separated from the respective faces of the moderating block 22 by around 2.5 cm, but in other cases other separations may be used, for example somewhere in the range 1.5 cm to 10 cm. It will be appreciated that in other examples there may be more or less moderating material around the group of detector blades according to the amount of moderation desired.

Output signals 12 from the photodetectors of the respective detector blades 2 are output to a processing unit 24. The processing unit is configured to determine from the output signals 12 whether a neutron detection event has occurred, for example using broadly conventional techniques, and to output a signal indicating when a neutron detection event is deemed to have occurred. In this example the processing unit 24 is represented as receiving separate output signals from the respective detector blades 2 comprising the detector module 20, and may process these separately, and so potentially provide information indicating which detector blade was involved in the neutron detection event (although typically this information will not be considered especially relevant for assay purposes). In another example the output signals 12 from some, or all, of the detector blades comprising a detector module may be combined before processing so the processing unit 24 is only able to determine whether at least one of the detector blades associated with the output signals which have been combined was involved in a neutron detection event. Combining output signals from multiple detector blades for processing together reduces the amount of processing required, but with a loss in positioning resolution. However, for assay purposes the positioning resolution of a detector is often not of primary significance. In this example a single processing unit is provided for the detector module 20. However, it will be appreciated that in some examples the processing of signals from one (or more than one) detector blades may be performed using separate processing units. Furthermore, in a detector comprising multiple detector modules, there may, for example, be one processing unit per detector module, or a single processing unit for handling signals received from a plurality of detector modules. In this regard, it will be appreciated the manner in which the output signals are collected for processing is not significant. The functionality of the processing unit 24 can be provided in various different ways, for example using a single suitably programmed general purpose computer, or suitably configured application-specific integrated circuit(s)/circuitry. In some examples in which each detector blade is associated with its own processing unit for providing output pulses in response to neutron detection events, the respective processing functionality may be provided at the detector blade itself (e.g. using circuitry adjacent the blade's photodetector) such that the output signals from the detector blades comprise TTL pulses indicating a neutron detection event. These pulses may be analysed separately or may be combined before analysis (e.g. using a logical "OR" gate) for subsequent coincidence analysis in accordance with conventional coincidence detection techniques for nuclear assay purposes (i.e. using established shift register techniques).

FIG. 7 schematically represents in perspective view a neutron detector 30 comprising four detector modules 20 of the kind represented in FIG. 6. The four detector modules 20 are arranged around a sample volume/space 32 for receiving a sample to be assayed. The neutron detector modules 20 are arranged so the detector blades 2 embedded within the respective detector modules do not squarely face the sample space but are arranged generally side on to the sample space 32 (i.e. generally with their respective side edges facing the sample space). Put another way, the detector blades are arranged such that their largest-area surfaces (at least for the majority of detector blades) are more closely aligned with a radius from the centre of the sample space 32 than a direction which is orthogonal to a radius from the centre of the sample space 32. The inventors have identified that providing the neutron detector blades in this type of side-on configuration relative to the sample to be measured can in some scenarios provide enhanced performance. Nonetheless, in other examples, the detector blades may be arranged square on to the sample space (i.e. generally parallel, as opposed to perpendicular, with respect to the largest surfaces of the respective detector modules). Although not represented in FIG. 7, output signals from the respective detector blades may be routed for processing in one or more processing units of the kind represented in FIG. 6 to provide neutron detection event signals (e.g. TTL pulses) in response to neutron detection events. These neutron detection event signals may be processed to establish a coincidence rate in accordance with conventional techniques for nuclear assay detectors. That is to say, in some respects the detector modules 20 in accordance with embodiments of the invention may be seen as "drop-in" replacements for, for example, banks of 3-He tubes in known nuclear assay detectors. In this regard, the processing unit(s) 24 coupled to the respective detector blades may be configured to provide neutron detection event signals (trigger pulses) corresponding to those provided from a conventional 3-He based detector. Accordingly, the subsequent processing of the neutron detection event signals to determine coincidence rates may be performed using existing processing apparatus and techniques.

Thus, a detector of the kind represented in FIG. 7 may provide a detector for nuclear assay purposes having a broadly corresponding geometry to existing 3-He detectors, for example as represented in FIG. 1. The inventors have identified through modelling that such detectors can also have comparable performance capabilities. Furthermore, by providing groups of detector blades in detector modules as described here in it becomes a simple task to provide different detector configurations by simply using different numbers of detector modules in different configurations. For example, FIGS. 8 and 9 schematically represent other example arrangements of detector modules 20 of the kind recommended in FIG. 6 to provide other detector assemblies around respective sample spaces 32 according to different embodiments of the invention. FIGS. 8 and 9 represent the respective detectors in horizontal cross-section (i.e. in a plane parallel to the end-faces of the respective detector modules). The detector of FIG. 8 comprises a single "ring" of detector modules, and differs from the arrangement of FIG. 7 by in-effect providing detector blades in the corner regions of the detector assembly (i.e. in the empty spaces adjacent the site-edges of the respective detector modules 20 in the arrangement of FIG. 7). The detector of FIG. 9 has some similarities to the detector of FIG. 8, but comprises a second ring of detector modules arranged around the first ring of detector modules.

The modularity of detectors provided in accordance with some embodiments of the invention therefore provide a large degree of flexibility in how different sized detectors can be readily configured. This can be more readily achieved when the width of a detector module is an integer multiple of the thickness of the detector module, for example a factor of two, as in the examples represented the FIGS. 8 and 9. It will be appreciated there are many other configurations which could be provided. For example, the detector modules 20 comprising a detector in accordance with an embodiment of the invention may be arranged in a ring with their respective side-edges at angles to one another, for example with the detector modules aligned with the size of a pentagon or hexagon, or higher-ordered polygon. Furthermore, detector modules of the kind represented in FIG. 6 can be arranged above and below a sample space 32 to provide near complete coverage around a sample space.

It will further be appreciated that the detector modules need not comprise a rectangular blocks. For example in a detector module 40 according to another embodiment of the invention as schematically represented in perspective view in FIG. 10, a moderating block 44 comprises a cylindrical annulus around a sample space 42. The individual detector blades 2 are embedded within the cylindrical annulus at an angle to a radius from the centre of the sample space 42, as schematically represented in the figure. In other examples the detector blades may be embedded radially (i.e. with their largest surfaces aligned parallel to radial lines from the centre of the sample space 42). However, the inventors have found the modelled performance of a configuration of the type represented FIG. 10 can be improved by having the detector blades arranged generally radially, but inclined with respect to radii, for example by 30° or less. It will be appreciated the detector 40 represented in FIG. 10 may comprise a single detector module (i.e. the annular cylinder of moderating block may be provided as a single element), or may comprise multiple detector modules (e.g. with each module comprising a part of an annular cylinder). The inventors have found from modelling that detector of the kind represented in FIG. 10 may be expected to display a performance associated with a figure of merit which is perhaps 50% greater than a correspondingly-sized 3-He based detector.

Thus to summarise some aspects of some embodiments of the invention, $^{6\text{-}Li}$F:ZnS(Ag)-based neutron detection techniques are provided for use in nuclear assay counters for which an 3-He-alternative drop-in technology is highly desirable. The use of relatively compact 6-LiF:ZnS-based detector blades and relatively compact silicon photomultipliers helps to provide detector configurations in which neutron detector blades can be readily embedded within a moderating material to help ensure relatively rapid incident neutron thermalisation and their subsequent detection. Detection of thermal neutrons using a close-packed detector geometry is often desired for the active or passive non-destructive assay of nuclear material. Monte Carlo simulations indicate that a neutron coincidence counter utilizing detector configurations such as those described above in accordance with embodiments of the invention compare favourably with traditional 3-He-based counters of comparable geometry on terms of having a comparable neutron detection efficiency and a shorter die-away time. A shorter die-away time permits the use of shorter windows for coincidence analysis which can help reduce false-coincidences (i.e. unrelated events occurring by chance within a coincidence detection window) and so help improve measurement accuracy over a given measurement period.

Thus there has been described a neutron detector that comprises one or more neutron detector modules. Each neutron detector module comprises a neutron moderating block having a plurality of neutron detector blades embedded therein. Each neutron detector blade is generally planar and comprises conversion layers on either side of a light-guiding sheet. Each conversion layer comprises a mixture of a neutron absorbing material and a scintillation material. This light-guiding sheet is arranged to receive photons emitted from the scintillation material. A photodetector is optically coupled to the light-guide and arranged to detect photons generated in the conversion layers as a result of neutron absorption events and received into the light-guiding sheet.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] D. T. Reilly, "Passive Nondestructive Assay of Nuclear Materials", Office of Nuclear Regulatory Research, NUREG/CR-5550, Los Alamos National Laboratory Document LA-UR-90-732 (1990).
[2] http://www.canberra.com/products/waste_safeguard_systems/pdf/JCC-31-SS-C36906.pdf
[3] H. O. Menlove, J. E. Stewart, and D. R. Mayo, "Advanced Performance Epithermal Neutron Detector for Measurement of Plutonium Inventory Samples," presented at the 6th International Meeting on Facility Operations—Safeguards Interface, sponsored by the American Nuclear Society Isotopes and Radiation Division, Jackson Hole, Wyo., Sep. 20-24, 1999, Los Alamos National Laboratory document LA-UR-99-2861.
[4] http://www.canberra.com/products/waste_safeguard_systems/pdf/JCC-71-72-73-SS-C38898.pdf
[5] WO 2012/007734 A2 (Symetrica Limited)
[6] A novel neutron multiplicity detector using lithium fluoride and zinc sulphide scintillator, Barton, J. C. et al, J Phys G 17, p 1885-1899, 1991.
[7] A. Favalli, et. al, "6Li foil scintillation sandwich thermal neutron detector," Nuclear Instruments and Methods in Physics Research A, Volume 652, Issue 1, p. 417-420
[8] M. C. Browne, et al., Prototype Neutron-Capture Counter for Fast-Coincidence Assay of Plutonium in Residues, 23rd ESARDA Annual meeting
[9] Richard, Kouzes and Ely, J. H. Final Technical Report for the Neutron Detection without Helium-3Projects.: Pacific Northwest National Laboratory, 2013. PNNL-23011.
[10] The IAEA Workshop on Requirements and Potential Technologies for Replacement of 3He Detectors in IAEA Safeguards Applications Mark M. Pickrell, Anthony D. Lavietes, Victor Gavron, Daniela Henzlova, Malcolm J. Joyce, Richard T. Kouzes, Howard O. Menlove JNMM, Journal of the Institute of Nuclear Materials Management March 2013; 41(2):14-29.
[11] A. P. Simpson, M. J. Clapham, S. Jones, S. A, McElhaney, A review of neutron detection technology alternatives to helium-3 for safeguards applications, INMM 52nd Annual Meeting, Jul. 17-21, 2011, Palm Desert, Calif.
[12] U.S. Pat. No. 7,002,159 B2 (Assignee: Proportional Technologies, Inc.) D. Henzlova, H. O. Menlove, M. T. Swinhoe, J. B. Marlow, Summary of Project on Design and Development of a Safeguards Coincidence Counter Based on Boron-lined Proportional Detector Technology—High Level Neutron counter Boron (HLNB), Los Alamos National Laboratory document LA-UR-12-24876, September 2012.

What is claimed is:

1. A neutron detector comprising one or more neutron detector modules, each neutron detector module comprising a neutron moderating block having a plurality of neutron detector blades embedded therein, wherein each neutron detector blade comprises: a conversion layer comprising a mixture of a neutron absorbing material and a scintillation material; a light-guide arranged to receive photons emitted from the scintillation material; and a photodetector optically coupled to the light-guide and arranged to detect photons generated as a result of neutron absorption events in the conversion layer; and wherein each of the one or more neutron detector modules has a cross-section in a plane perpendicular to an axis of extent of the neutron detector which comprises at least a part of an annular ring.

2. The neutron detector of claim 1, wherein the neutron detector comprises a plurality of neutron detector modules.

3. The neutron detector of claim 1, wherein for each neutron detector blade the conversion screen comprises a first conversion screen disposed on a first side of the light-guide and the neutron detector blade further comprises a second conversion screen disposed on a second side of the light-guide, the second side opposing the first side, such that the light-guide is arranged to also receive photons emitted from the second conversion screen.

4. The neutron detector of claim 1, wherein each neutron detector blade is in the form of a planar sheet having:
a characteristic length within a range of 10 cm to 90 cm; and/or a characteristic width within a range of 1 cm to 25 cm; and/or a characteristic thickness less than or equal to an amount of 1 cm.

5. The neutron detector of claim 1, wherein each neutron detector blade is in the form of a planar sheet having with a thickness matched to a width of the sensitive area of its photodetector.

6. The neutron detector of claim 1, wherein each neutron detector blade has a length and a width and a thickness, and wherein:

the length is greater than the width by more than a factor of 4; and/or the width is greater than the thickness by more than a factor of 5.

7. The neutron detector of claim 1, wherein neighbouring neutron detector blades in the one or more neutron detector modules are separated by an amount within a range of 0.5 cm to 10 cm.

8. The neutron detector of claim 1, wherein each of the one or more neutron detector modules has a cross-section in a plane perpendicular to an axis of extent of the neutron detector which comprises a rectangle.

9. The neutron detector of claim 8, wherein each neutron detector module is in the form of a rectangular block having:

a characteristic length within a range of 30 cm to 120 cm; and/or a characteristic width within a range of 10 cm to 50 cm; and/or a characteristic thickness within a range of 3 cm to 30 cm.

10. A neutron detector comprising one or more neutron detector modules, each neutron detector module comprising a neutron moderating block having a plurality of neutron detector blades embedded therein, wherein each neutron detector blade comprises: a conversion layer comprising a mixture of a neutron absorbing material and a scintillation material; a light-guide arranged to receive photons emitted from the scintillation material; and a photodetector optically coupled to the light-guide and arranged to detect photons generated as a result of neutron absorption events in the conversion layer; and wherein the one or more neutron detector modules are arranged so that the neutron detector blades at least partially surround a sample volume for receiving a sample from which neutrons are to be detected.

11. The neutron detector of claim 10, wherein the one or more neutron detector modules are arranged so that a first group of neutron detector blades at least partially surrounds the sample volume and a second group of neutron detector blades at least partially surrounds the sample volume and the first group of neutron detector blades.

12. The neutron detector of claim 10, wherein at least the majority of neutron detector blades comprising the neutron detector have their largest surfaces arranged in a way which is not squarely facing the sample volume.

13. The neutron detector of claim 1, wherein for each neutron detector blade the photodetector comprises a solid state photodetector.

14. The neutron detector of claim 1, further comprising a processor arranged to receive output signals from the photodetectors and to process the output signals to determine when neutron detection events occur in one or more of the neutron detector blades.

15. The neutron detector of claim 14, wherein the output signals comprise photodetector signals from respective neutron detector blades.

16. The neutron detector of claim 14, wherein the output signals comprise combined photodetector signals from groups of neutron detector blades.

17. The neutron detector of claim 16, wherein the neutron detector blades in each group of neutron detector blades for which output signals are combined are the neutron detector blades in a neutron detector module.

18. A method for detecting neutrons, comprising: providing one or more neutron detector modules, each neutron detector module comprising a neutron moderating block having a plurality of neutron detector blades embedded therein, and wherein each neutron detector blade comprises: a conversion layer comprising a mixture of a neutron absorbing material and a scintillation material; a light-guide arranged to receive photons emitted from the scintillation material; and a photodetector optically coupled to the light-guide and arranged to detect photons generated as a result of neutron absorption events in the conversion layer; and wherein the one or more neutron detector modules are arranged so that the neutron detector blades at least partially surround a sample volume for receiving a sample from which neutrons are to be detected; and wherein the method comprises detecting photons generated in respective conversion layers and received in the respective light-guides using the respective photodetectors.

* * * * *